United States Patent
Maienschein et al.

(10) Patent No.: US 11,788,584 B2
(45) Date of Patent: Oct. 17, 2023

(54) TORQUE TRANSMITTING DEVICE

(71) Applicant: Schaeffler Technologies AG & Co. KG, Herzogenaurach (DE)

(72) Inventors: Stephan Maienschein, Baden-Baden (DE); René Daikeler, Sasbach (DE); Christian Hügel, Rheinau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/640,859

(22) PCT Filed: Jul. 23, 2020

(86) PCT No.: PCT/DE2020/100652
§ 371 (c)(1),
(2) Date: Mar. 7, 2022

(87) PCT Pub. No.: WO2021/043356
PCT Pub. Date: Mar. 11, 2021

(65) Prior Publication Data
US 2022/0341472 A1    Oct. 27, 2022

(30) Foreign Application Priority Data
Sep. 5, 2019   (DE) ............... 10 2019 123 790.4

(51) Int. Cl.
*F16H 48/02* (2006.01)
*B60K 6/38* (2007.10)
(Continued)

(52) U.S. Cl.
CPC ............ *F16D 25/0635* (2013.01); *B60K 6/40* (2013.01); *B60K 6/48* (2013.01); *F16D 21/06* (2013.01);
(Continued)

(58) Field of Classification Search
CPC .................. B60K 6/40; B60K 6/48; F16H 45/02–2045/0294
See application file for complete search history.

(56) References Cited

U.S. PATENT DOCUMENTS 5,330,038 A * 7/1994 Haka ................ F16H 45/02
                                                    464/24
7,114,604 B2 * 10/2006 Masuya ............ B60K 6/387
                                                    192/3.3
(Continued)

FOREIGN PATENT DOCUMENTS

| DE | 102007053871 | 6/2008 |
| DE | 102009020672 | 12/2009 |
| EP | 1541401 | 6/2005 |

*Primary Examiner* — Timothy Hannon
*Assistant Examiner* — Farhana Pervin
(74) *Attorney, Agent, or Firm* — Volpe Koenig

(57) ABSTRACT

A torque transmitting device for transmitting torque between a first drive element and an output element, having a torque transmitting unit with a housing delimiting a first fluid chamber filled with a liquid, and a separating clutch arranged outside of the torque transmitting unit and the first fluid chamber in a second fluid chamber separated from the first chamber and which selectively transmits torque between the first drive element and the torque transmitting unit. The separating clutch has a clutch output that is connectable to a clutch input via a friction device and a clutch actuator that comprises a pressing element and an actuation element to which fluid pressure can be applied to move the actuation element. The pressing element is arranged within the second fluid chamber, and the actuation element is at least partly arranged within the first fluid chamber so that pressure is applied thereto by fluid pressure.

17 Claims, 2 Drawing Sheets

(51) Int. Cl.
    *F16D 25/0635*     (2006.01)
    *B60K 6/40*     (2007.10)
    *B60K 6/48*     (2007.10)
    *F16D 21/06*     (2006.01)
    *F16H 45/02*     (2006.01)
    *F16H 45/00*     (2006.01)

(52) U.S. Cl.
    CPC ...... *F16H 45/02* (2013.01); *B60K 2006/4825* (2013.01); *F16H 2045/002* (2013.01); *F16H 2045/0247* (2013.01); *F16H 2045/0294* (2013.01)

(56) References Cited

U.S. PATENT DOCUMENTS

| | | | | |
|---|---|---|---|---|
| 2008/0156608 | A1* | 7/2008 | Kombowski | F16D 21/06 192/48.1 |
| 2009/0305847 | A1* | 12/2009 | Klump | F16D 48/06 477/86 |
| 2010/0038201 | A1* | 2/2010 | Mueller | F16D 25/0638 903/914 |
| 2010/0081540 | A1* | 4/2010 | Krause | B60K 6/48 477/3 |
| 2010/0193320 | A1* | 8/2010 | Kombowski | F16H 45/02 192/30 V |
| 2013/0081917 | A1* | 4/2013 | Hauck | F16D 21/02 192/48.601 |
| 2015/0323060 | A1* | 11/2015 | Torii | F16H 3/663 475/116 |
| 2020/0116210 | A1* | 4/2020 | Chae | F16D 31/08 |

* cited by examiner

TORQUE TRANSMITTING DEVICE

CROSS-REFERENCE TO RELATED APPLICATIONS

This application is the U.S. National Phase of PCT Appln. No. PCT/DE2020/100652, filed Jul. 23, 2020, which claims priority from German Patent Application No. 10 2019 123 790.4, filed Sep. 5, 2019, the entire disclosures of which are incorporated by reference herein.

TECHNICAL FIELD

The disclosure relates to a torque transmitting device.

BACKGROUND

A torque transmitting device is known, for example, from DE 10 2009 020 672 A1. The torque transmitting device is arranged in a hybrid drive train between a first drive element and a transmission and comprises a torque transmitting unit which has a torque converter, a separating clutch and a second drive element designed as an electric motor. The electric machine, the separating clutch, and the torque converter are designed as preassembled structural units and in the assembled state, the torque converter and the separating clutch are sealed in a liquid-tight manner from the electrical machine.

SUMMARY

The object of the present disclosure is to make a separating clutch simpler, more cost-effective, and more reliable.

At least one of these objects is achieved by a torque transmitting device having one or more of the features disclosed herein. As a result, the separating clutch can be operated more reliably. The risk of functional impairment of the separating clutch due to contact with a liquid, for example a leakage fluid, is reduced.

The torque transmitting device can be arranged in a drive train of a vehicle. The first drive element can be an internal combustion engine. The output element itself can be a transmission.

The torque transmitting unit can be connected to a second drive element, preferably an electric motor. The second drive element can introduce a drive torque into the torque transmitting unit. The torque transmitting unit can have a torque converter, a wet clutch, in particular a wet starting clutch or wet double clutch, a torsional vibration damper and/or a centrifugal pendulum.

The housing can be formed at least partly by a converter housing of the torque converter. The liquid arranged in the first fluid chamber can be a working fluid of the torque converter, in particular to bring about a torque transmission between a pump and a turbine of the torque converter.

The first fluid chamber can be completely filled with the liquid. The fluid pressure acting on the actuation element can be provided by the same liquid that is also arranged within the first fluid chamber.

The separating clutch can be a K0 clutch. The separating clutch can be operated dry. The second fluid chamber can be free of a liquid. The separating clutch can be designed as a multiple disc clutch having several friction discs forming part of the friction device. The clutch input can be connected to a torsional vibration damper effectively arranged between the first drive element and the separating clutch.

A centrifugal pendulum can be arranged in the first and/or second fluid chamber.

The second fluid chamber can have a fluid that is separate from the liquid. The fluid can be air or a liquid. The liquid in the second fluid chamber can effect spray cooling of the separating clutch.

In a preferred embodiment, the actuation element is axially movable by the fluid pressure. The actuation element can be designed as a pressure piston. The actuation element can bring about an at least partial torque transmission between the separating clutch and the torque transmitting unit.

In a specific embodiment, the actuation element is connected to the pressing element via a transmission element that is movable on the basis of the movement of the actuation element, wherein the transmission element movably moves through the housing. The transmission element can be interlockingly connected to the pressing element. The transmission element can move through the housing radially on the inside. The transmission element can be connected to the actuation element as a component designed separately from the latter or can be designed in one piece with the actuation element. The actuation element and the pressing element can be designed as separate components or in one piece with one another. The pressing element and the connection component can be designed as separate components or in one piece.

In a preferred embodiment, the transmission element brings about an at least partial torque transmission of the first drive torque provided by the first drive element between the separating clutch and the torque transmitting unit.

In a further specific embodiment, the transmission element has at least one sealing device effective with respect to a connection component for sealing the first fluid chamber. The transmission element can be arranged radially inward of the connection component.

In a preferred embodiment, the actuation force can be supported via the connection component. The actuation force upon actuation of the separating clutch can be supported in a closed force flow via the transmission element and the connection component.

In an advantageous embodiment, the actuation element is movable by the fluid pressure against the action of a restoring element, wherein the restoring element is attached to the connection component or a component connected to the connection component. The separating clutch can be designed in normally-open or in normally-closed mode of operation. In normally-open operation, the application of pressure to the actuation element causes an actuation force to close the separating clutch. If there is no actuation pressure, the restoring element can cause the separating clutch to open via the actuation element. In the case of normally-closed operation, the operating mode is reversed.

In a preferred embodiment, the actuation element and the pressing element are arranged to be axially spaced apart and radially overlapping one another.

In a specific embodiment, a partition is arranged in an axial space formed by the actuation element and the pressing element. The torque transmitting unit can be supported via a support bearing arranged in the axial gap. The torque transmitting unit can be supported on the partition. The partition can be designed separately from the housing or in one piece with the housing.

BRIEF DESCRIPTION OF THE DRAWINGS

Further advantages and advantageous embodiments according to the present disclosure result from the description of the figures and the drawings.

The embodiments described in detail below with reference to the drawings. Specifically.

DETAILED DESCRIPTION

Figure 1:
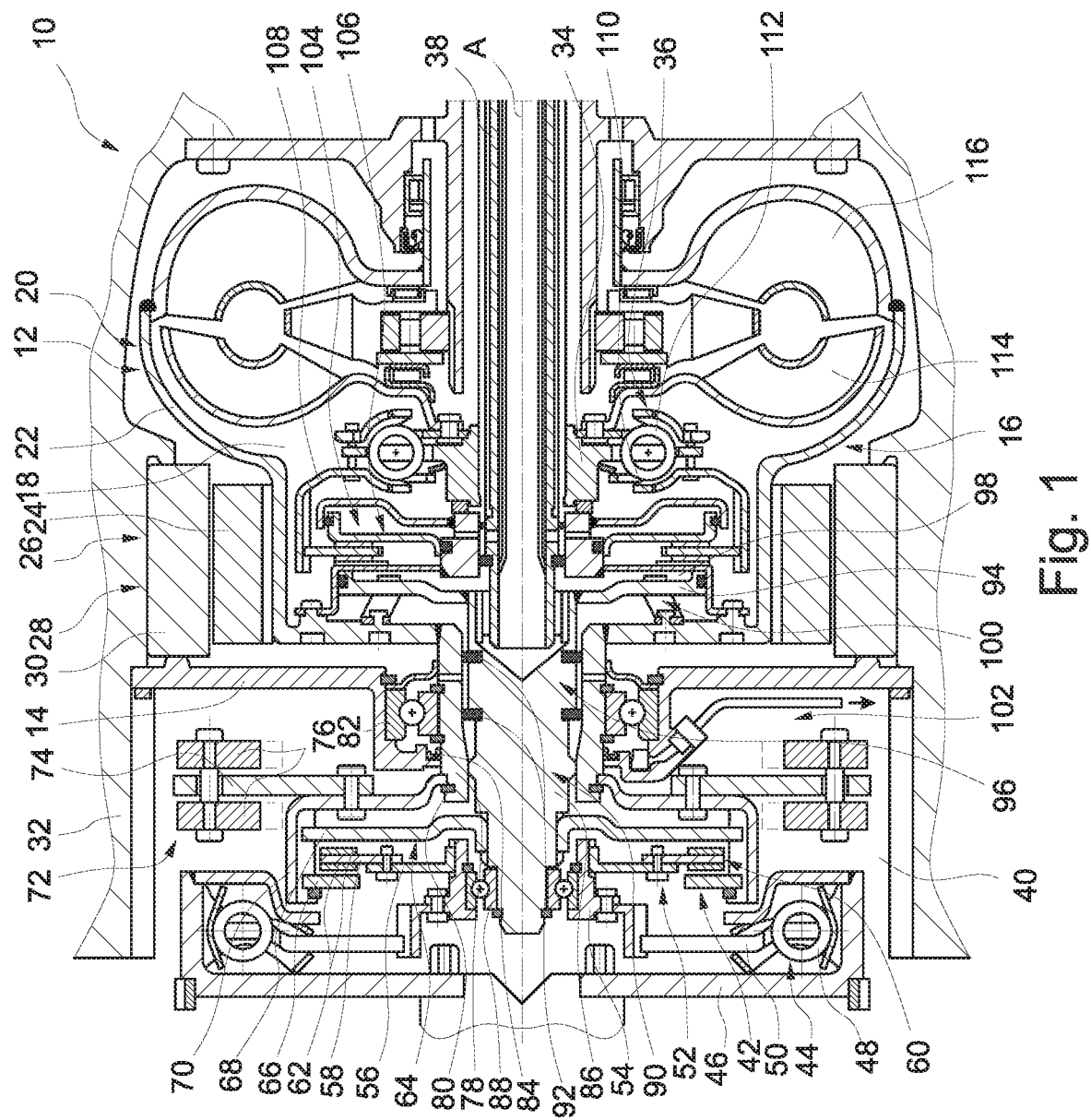
FIG. 1: shows a cross-section of a torque transmitting device in a specific embodiment according to the present disclosure.

FIG. 1 shows a cross-section of a torque transmitting device 10 in a specific embodiment according to the present disclosure. The torque transmitting device 10 is arranged in a drive train of a vehicle and causes a torque transmission between a first drive element, not shown here, and an output element, also not shown here. The first drive element can be an internal combustion engine and the output element can be a transmission.

The torque transmitting device 10 comprises a torque transmitting unit 12 having a partition 14 and a housing 16 for delimiting a first fluid chamber 18 that can in particular be completely filled with a liquid. The torque transmitting unit 12 comprises a torque converter 20, which in turn has a converter housing 22 which at least partly forms the housing 16. A rotor 24 of an electric motor 26, which acts as a second drive element 28, is fastened to the converter housing 22. The rotor 24 is rotatable with respect to a stator 30, wherein the stator 30 is fastened to a transmission housing 32. The housing 16 is arranged within the transmission housing 32. The torque transmitting unit 12 is connected to an output 34, here a damper output hub of a torsional vibration damper 36 arranged within the torque converter 20, with the output element, in particular via a transmission input shaft 38.

Outside of the torque transmitting unit 12 and the first fluid chamber 18, a separating clutch 42 for the optional torque transmission between the first drive element and the torque transmitting unit 12 is arranged in a second fluid chamber 40 that is separated from the latter in a fluid-tight manner. The separating clutch 42 is designed to be dry and the second fluid chamber 40 is free of a liquid. A torsional vibration damper 44 is arranged between the separating clutch 42 and the first drive element, which has a damper input 46 which is connected to the first drive element and a damper output 50 which can be rotated to a limited extent by the action of bow springs 48 relative to the damper input 46 and which is connected to a clutch input 52 of the separating clutch 42 via a connecting hub 54 and an input multiple disc carrier 56, has. For this purpose, the damper output 50 is connected in a rotationally fixed manner to the connecting hub 54 and this in turn is connected to the input multiple disc carrier 56 via a toothing that allows axial displacement.

The input multiple disc carrier 56 is connected in a rotationally fixed manner to at least one friction disc 58, here riveted, which is part of a friction device 60 of the separating clutch 42. The friction disc 58 has friction linings 62 on both sides, which can be frictionally connected to a clutch output 64, which has an end disc 66, an axially displaceable pressing element 68 and an output multiple disc carrier 70 for transmitting the drive torque of the first drive element.

The output multiple disc carrier 70 is connected to a centrifugal pendulum 72. The centrifugal pendulum 72 has a pendulum mass carrier 74 on which at least one pendulum mass 76 is received so that it can be deflected to a limited extent along a pendulum path. The pendulum mass carrier 74 is riveted here in particular to the output multiple disc carrier 70.

The output multiple disc carrier 70 is axially secured on a connection component 78 via a securing ring 80 and received in a radially centered manner. The connection component 78 is rigidly connected to the converter housing 22. The torque transmitting unit 12 is supported on the partition 14 via the connection component 78 and a support bearing 82 fixed thereon. Furthermore, a sealing device 84 is arranged between the connection component 78 and the partition 14. The partition 14 is firmly connected to the transmission housing 32, here screwed thereinto.

The pressing element 68 is connected in a rotationally fixed manner to a transmission element 86 via a toothing. The connection component 78 and the transmission element 86 are connected to one another in a rotationally fixed manner and axially displaceable relative to one another. The transmission element 86 can be rotated relative to the connecting hub 54 via a bearing 88. The transmission element 86 and also the connection component 78 are connected in a rotationally fixed manner to the clutch output 64 and both at the same time or only the transmission element 86 alone can introduce a torque from the first drive element into the torque transmitting unit 12 and thus form an input 90 of the torque transmitting unit 12 that is rotatable about an axis of rotation A. The portion of the connection component 78 in the torque transmission is measured here in particular by the torque transmitting capacity of the connection between the output multiple disc carrier 70 and the connection component 78.

The transmission element 86 is arranged radially inward of the connection component 78. Two sealing elements 92 are arranged radially between the transmission element 86 and the connection component 78, which seal the first and second fluid chambers 18, 40 from one another. The axially movable transmission element 86 extends radially inside of the partition 14 through the housing 16 and is firmly connected to an actuation element 94. The actuation element 94 is assigned to a clutch actuation device 96 of the separating clutch 42. The clutch actuation device 96 comprises the actuation element 94, the connection component 78, and the pressing element 68.

The actuation element 94 can have a fluid pressure applied thereupon and is axially movable on the basis thereof. The pressing element 68 transmits an actuation force of the actuation element 94 to the friction device 60 to bring about a frictional connection between the clutch input 52 and the clutch output 64. A fluid pressure acting on the actuation element 94 in the pressure chamber 98 thus causes an axial deflection of the actuation element 94 in the direction of the separating clutch 42. The actuation movement is transmitted to the pressing element 68 by the transmission element 78. The pressing element 68 directs the actuation force into the friction device 60 for closing the separating clutch 42, which thus brings about a frictional connection for torque transmission between the clutch input 52 and the clutch output 64.

The actuation element 94 is connected to a restoring element 100 which has multiple leaf springs and which is firmly connected to the converter housing 22. If the fluid pressure in the pressure chamber 98 for closing the separating clutch 42 falls below a predetermined value, the actuation element 94 is moved by the restoring element 100 into an initial position in which the separating clutch 42 is open and the clutch input 52 and the clutch output 64 can be mutually rotated and the separating clutch 42 interrupts a torque transmission.

The pressing element 68 is arranged outside of the first fluid chamber 18 and inside of the second fluid chamber 40, and the actuation element 94 is arranged within the first fluid chamber 18 for the application of pressure by the fluid pressure. As a result, the risk of functional impairment of the separating clutch 42 due to contact with a liquid, in particular due to a leakage fluid from the first fluid chamber 18, can be reduced.

The actuation force brought about by the clutch actuation device 96 to close the separating clutch 42 is supported by the connection component 78. In this case, a closed flow of force when the separating clutch 42 is actuated is brought about via the transmission element 86 and the connection component 78. The actuation element 94 and the pressing element 68 are arranged to be axially spaced apart and radially overlapping one another. The partition 14 is arranged in an axial intermediate space 102 formed by the actuation element 94 and the pressing element 68, in which the support bearing 82 is arranged.

The torque converter 20 has a converter lock-up clutch 104 having a clutch input 106 which is connected to the converter housing 22. A clutch output 108 of the converter lock-up clutch 104 is connected to a damper input 110 of the torsional vibration damper 36. The damper output hub 34 can be rotated to a limited extent with respect to the damper input 110 via the action of at least one compression spring 112. The damper input 110 is connected to a turbine 114 which, via the liquid present in the first fluid chamber 18, can effect a torque transmission with a pump 116 connected to the converter housing 22.

Figure 2:
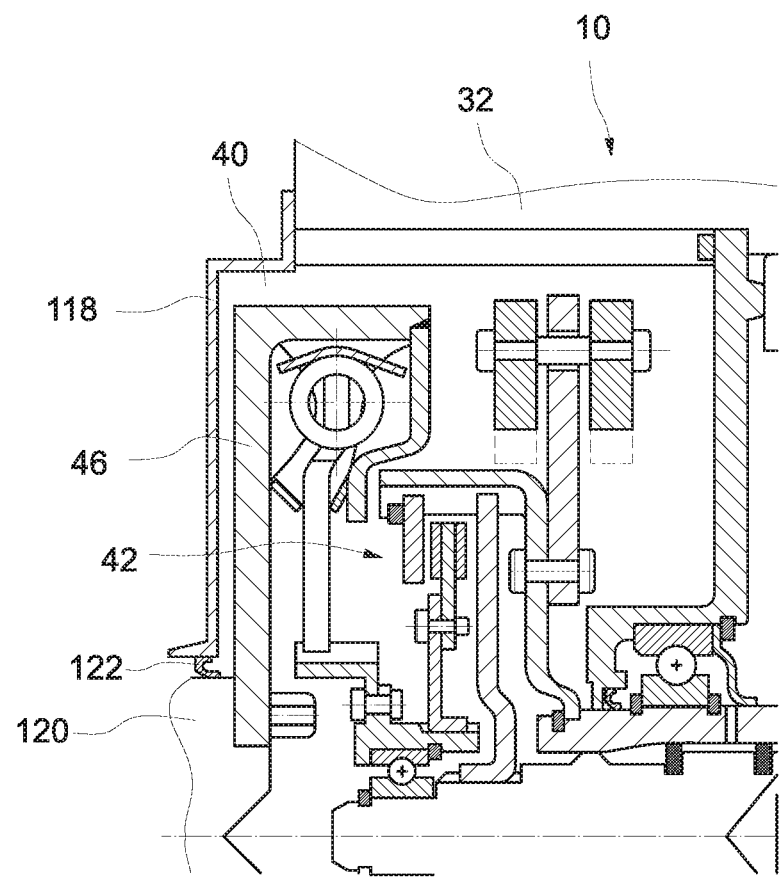
FIG. 2: shows a detail of a cross-section of a torque transmitting device in a further specific embodiment according to the present disclosure.

FIG. 2 shows a detail of a cross-section of a torque transmitting device 10 in a further specific embodiment. The second fluid chamber 40 can have a liquid that is separate from the liquid of the first fluid chamber. This liquid can cause spray cooling of the separating clutch 42. The second fluid chamber 40 is sealed off in a liquid-tight manner via a cover plate 118 connected to the transmission housing 32. A seal 122 is attached between a drive hub 120 connected to the damper input 46 and the cover plate.

LIST OF REFERENCE SYMBOLS

10 Torque transmitting device
12 Torque transmitting unit
14 Partition
16 Housing
18 First fluid chamber
20 Torque converter
22 Converter housing
24 Rotor
26 Electric motor
28 Second drive element
30 Stator
32 Transmission housing
34 Outlet
36 Torsional vibration damper
38 Transmission input shaft
40 Second fluid chamber
42 Separating clutch
44 Torsional vibration damper
46 Damper input
48 Bow spring
50 Damper output
52 Clutch input
54 Connecting hub
56 Input multiple disc carrier
58 Friction disc
60 Friction device
62 Friction lining
64 Clutch output
66 End disc
68 Pressing element
70 Output multiple disc carrier
72 Centrifugal pendulum
74 Pendulum mass carrier
76 Pendulum mass
78 Connection component
80 Securing ring
82 Support bearings
84 Sealing device
86 Transmission element
88 Bearing
90 Inlet
92 Sealing element
94 Actuation element
96 Clutch actuation device
98 Pressure chamber
100 Restoring element
102 Gap
104 Converter lock-up clutch
106 Clutch input
108 Clutch output
110 Damper input
112 Compression spring
114 Turbine
116 Pump
118 Cover plate
120 Drive hub
122 Seal
A Rotation axis

The invention claimed is:

1. A torque transmitting device for transmitting a torque between a first drive element and an output element, the torque transmitting device comprising:

a torque transmitting unit having a housing for delimiting a first fluid chamber that is finable with a liquid, an input which is rotatable about an axis of rotation that is couplable to the first drive element and an output which is connectable to the output element;

a separating clutch arranged outside of the torque transmitting unit and the first fluid chamber in a second fluid chamber separated in a fluid-tight manner and configured for selectable torque transmission between the first drive element and the torque transmitting unit, the separating clutch including a clutch input and a clutch output that is connectable therewith via a friction device and a clutch actuation device;

the clutch actuation device comprises a pressing element and an actuation element which is connected thereto, to which fluid pressure is appliable and is movable thereby, the actuation element and the pressing element are arranged to be axially spaced apart and non-overlapping, and radially overlapping one another;

the pressing element transmits an actuation force of the actuation element to the friction device to bring about a frictional connection between the clutch input and the clutch output, wherein the actuation element is connected to the pressing element via a transmission element which is movable via the movement of the actuation element, and the transmission element movably moves through the housing; and the pressing element is arranged outside of the first fluid chamber and within the second fluid chamber and the actuation element is at least partly arranged within the first fluid chamber so that pressure is applied thereto by the fluid pressure.

2. The torque transmitting device according to claim 1, wherein the actuation element is axially movable by the fluid pressure.

3. The torque transmitting device according to claim 1, wherein the transmission element causes an at least partial torque transmission of the first drive torque provided by the first drive element between the separating clutch and the torque transmitting unit.

4. The torque transmitting device according to claim 3, wherein the transmission element has at least one sealing device effective with respect to a connection component for sealing the first fluid chamber.

5. The torque transmitting device according to claim 4, wherein the actuation force is supported via the connection component.

6. The torque transmitting device according to claim 4, wherein the actuation element is movable against a force of a restoring element by the fluid pressure, and the restoring element is attached to the connection component or to a component connected with the connection component.

7. The torque transmitting device according to claim 1, further comprising a partition arranged in an axial space formed by the actuation element and the pressing element.

8. The torque transmitting device according to claim 7, wherein the torque transmitting unit is supported via a support bearing arranged in the axial space.

9. A torque transmitting device for transmitting a torque between a first drive element and an output element, the torque transmitting device comprising:
 a torque transmitting unit having a housing for delimiting a first fluid chamber that is finable with a liquid, an input which is rotatable about an axis of rotation that is couplable to the first drive element and an output which is connectable to the output element;
 a separating clutch arranged outside of the torque transmitting unit and the first fluid chamber in a second fluid chamber separated in a fluid-tight manner and configured for selectable torque transmission between the first drive element and the torque transmitting unit, the separating clutch including a clutch input and a clutch output that is connectable therewith via a friction plate and a clutch actuator;
 the clutch actuator comprises a pressing element and an actuation element which is connected thereto via an axially movable transmission element, and the actuation element is movable by application of fluid pressure;
 the pressing element transmits an actuation force of the actuation element to the friction plate to bring about a frictional connection between the clutch input and the clutch output;
 the pressing element is arranged outside of the first fluid chamber and within the second fluid chamber and the actuation element is at least partly arranged within the first fluid chamber so that pressure is applied thereto by the fluid pressure; and
 a partition is arranged in an axial space formed between the actuation element and the pressing element, wherein the torque transmitting unit is supported via a support bearing arranged in the axial space and at least partially supported by the partition.

10. The torque transmitting device according to claim 9, wherein the actuation element is axially movable by the fluid pressure.

11. The torque transmitting device according to claim 9, wherein the actuation element and the pressing element are arranged to be axially spaced apart and non-overlapping, and radially overlapping one another.

12. The torque transmitting device according to claim 9, wherein the support bearing is arranged radially between the partition and a connection component.

13. The torque transmitting device according to claim 9, wherein the transmission element causes an at least partial torque transmission of the first drive torque provided by the first drive element between the separating clutch and the torque transmitting unit.

14. The torque transmitting device according to claim 13, wherein the transmission element has at least one seal effective with respect to a connection component that is connected to the housing or a component of the housing for sealing the first fluid chamber.

15. The torque transmitting device according to claim 14, wherein the actuation force is supported via the connection component.

16. The torque transmitting device according to claim 14, wherein the actuation element is movable against a force of a restoring element by the fluid pressure, and the restoring element is attached to the connection component or to the component connected with the connection component.

17. A torque transmitting device for transmitting a torque between a first drive element and an output element, the torque transmitting device comprising:
 a torque transmitting unit having a housing for delimiting a first fluid chamber that is finable with a liquid, an input which is rotatable about an axis of rotation that is couplable to the first drive element and an output which is connectable to the output element;
 a separating clutch arranged outside of the torque transmitting unit and the first fluid chamber in a second fluid chamber separated in a fluid-tight manner and configured for selectable torque transmission between the first drive element and the torque transmitting unit, the separating clutch including a clutch input and a clutch output that is connectable therewith via a friction plate and a clutch actuator;
 the clutch actuator comprises a pressing element and an actuation element which is connected thereto via an axially movable transmission element, and the actuation element is movable by application of fluid pressure and the actuation element is movable against a force of a restoring element by the fluid pressure, the restoring element is attached to a connection component or the component connected with the connection element axially between the pressing element and the actuation element, and the restoring element is directly connected axially between and to the actuation element and the housing;
 the pressing element transmits an actuation force of the actuation element to the friction plate to bring about a frictional connection between the clutch input and the clutch output; and
 the pressing element is arranged outside of the first fluid chamber and within the second fluid chamber and the actuation element is at least partly arranged within the first fluid chamber so that pressure is applied thereto by the fluid pressure.

* * * * *